United States Patent [19]

Chen et al.

[11] Patent Number: 5,028,799
[45] Date of Patent: Jul. 2, 1991

[54] METHOD AND APPARATUS FOR THREE DIMENSIONAL OBJECT SURFACE DETERMINATION USING CO-PLANAR DATA FROM MULTIPLE SENSORS

[75] Inventors: Sullivan Chen, Centerport; Howard K. Stern, Greenlawn; William E. Yonescu, Dix Hills, all of N.Y.

[73] Assignee: Robotic Vision System, Inc., Hauppauge, N.Y.

[21] Appl. No.: 445,121

[22] Filed: Nov. 30, 1989

Related U.S. Application Data

[63] Continuation of Ser. No. 226,685, Aug. 1, 1988, abandoned.

[51] Int. Cl.$^5$ ...................... G01N 21/86; G01B 11/24
[52] U.S. Cl. ..................................... 250/561; 356/376
[58] Field of Search ............... 250/561, 560; 356/376, 356/1, 381; 358/107

[56] References Cited

U.S. PATENT DOCUMENTS

| | | | |
|---|---|---|---|
| 4,534,650 | 8/1985 | Clerget et al. | 356/376 |
| 4,541,723 | 9/1985 | Pirlet | 356/376 |
| 4,576,481 | 3/1986 | Hansen | 250/561 |
| 4,583,857 | 4/1986 | Grammerstorff et al. | 356/1 |
| 4,627,734 | 12/1986 | Rioux | 356/376 |
| 4,701,049 | 10/1987 | Beckmann et al. | 356/1 |
| 4,741,621 | 5/1988 | Taft et al. | 356/376 |
| 4,763,006 | 8/1988 | Rau et al. | 250/561 |
| 4,774,403 | 9/1988 | Arts | 250/561 |

OTHER PUBLICATIONS

"Automatic Visual Inspection of Solder Joints on Printed Circuit Boards", Yasuo Nakagawa, SPIE, vol. 336, Robot Vision (1982), pp. 121–126.

*Primary Examiner*—David C. Nelms
*Assistant Examiner*—Michael Messinger
*Attorney, Agent, or Firm*—Robin, Blecker, Daley & Driscoll

[57] ABSTRACT

A practice for developing data for use in the three-dimensional location of the points on an object surface wherein first and second sensor means are used to cause first and second electromagnetic radiation to be directed at the object surface at first and second directions which are in a common plane.

50 Claims, 3 Drawing Sheets

METHOD AND APPARATUS FOR THREE DIMENSIONAL OBJECT SURFACE DETERMINATION USING CO-PLANAR DATA FROM MULTIPLE SENSORS

This application is a continuation of application Ser. No. 226,685, filed Aug. 1, 1988, now abandoned.

BACKGROUND OF THE INVENTION

This invention relates to a method and apparatus for use in the three dimensional location of the points on an object surface and, in particular, to a method and apparatus which utilize data developed from projected and reflected electromagnetic radiation.

In one type of the above apparatus, the electromagnetic radiation used is optical radiation or light and the apparatus employs well known optical triangulation techniques to determine the spatial locations of the object surface points from the data derived from the projected and reflected optical radiation. In this apparatus, structured light, (i.e., light with a well defined and well known shape), is projected onto the object surface. The reflection of this light from the surface is then collected along a known angle to the projected light yielding three dimensional coordinate data of the object surface.

In one form of typical arrangement, a projected plane of light is used and where the plane of light intersects the object it forms a line of light on the object surface. A camera, located at a fixed angle from the light plane, views the reflection (i.e., collects the reflected light) and provides data from which the coordinates of each point on the line, relative to the projector/camera sensor, can be computed. Another typical arrangement uses a projected pencil beam of light and the intersection of this beam with the object surface results in a spot. This spot on the object surface is viewed by a camera which provides data for computing the precise location of the spot relative to the projector/camera sensor. By scanning the sensor relative to the object, all the object surface point locations can be determined.

In many applications, it is desirable to develop sensor data or view a particular object from different angles. The motives vary but include the desire to remedy specular reflection or to avoid obscuration. This can be accomplished by moving a single sensor or by providing multiple sensors. In either case, if the positions of the sensors are random, considerable data merging arithmetic and processing is needed in order to render this information useful for object surface description. Furthermore, inaccuracies in the sensor placement mechanism or the position encoders yields data "seams" which are highly detrimental in applications demanding high surface mapping accuracy.

It is, therefore, an object of the present invention to provide an apparatus and method for use in object surface determination in which the requirements of data merging in a multi-sensor environment are reduced.

SUMMARY OF THE INVENTION

In accordance with the principles of the present invention, the above and other objects are realized in a practice wherein a first sensor means is provided for causing first electromagnetic radiation to be directed at an object surface in a first direction in a first plane and wherein a second sensor means is provided for causing second electromagnetic radiation to be directed at the object surface in a second direction different from the first direction in the first plane. The first and second sensor means each collect their respective radiation reflected from the object surface and the collected radiation data is used to determine the positions of the surface points on the object.

By ensuring that the first and second radiation, while projected in different directions, are in the same first plane, the resultant collected radiation can be more readily merged or combined in the data processing procedures used to derive the object surface point locations. The processing is thus greatly simplified, thereby significantly improving the overall speed and accuracy of the sensing system.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
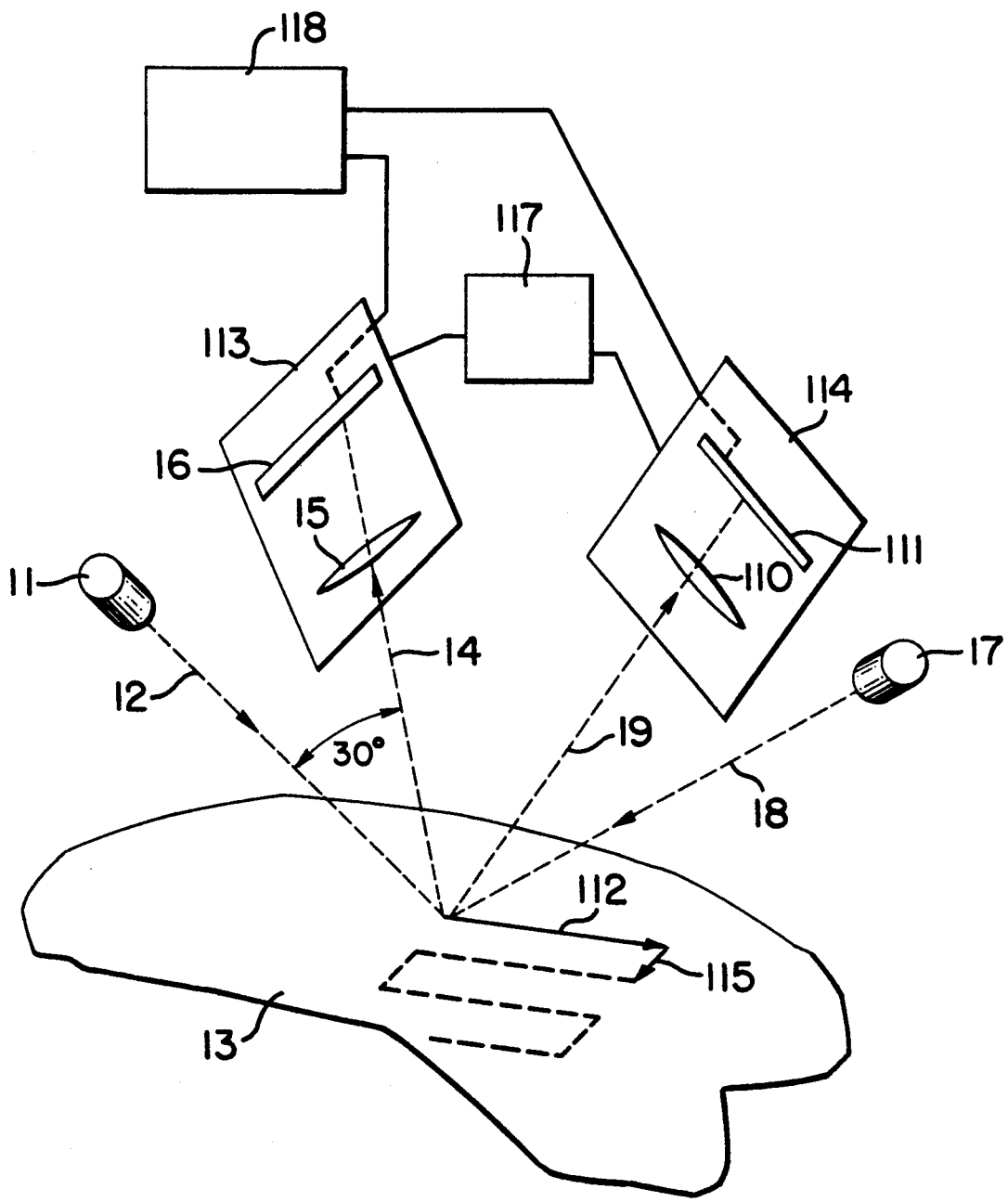
FIG. 1 shows a first embodiment of an apparatus in accordance with the principles of the present invention in which multiple sensor means are both arranged to operate in a common plane.

FIG. 1 shows a two-projector/detector (two sensor) arrangement in accordance with the principles of the present invention. A first projector 11 projects a narrow or pencil beam of electromagnetic radiation such as light 12 along a first direction onto the surface of an object 13. The reflected light 14 is collected by a camera assembly 113 which includes a lens 15 and an electromagnetic radiation sensitive detector such as a video chip or linear array of photo-sensitive detectors 16. Projector 11 and camera 113 together form an optical three dimensional measurement sensor capable of reporting the three dimensional coordinates of points on surfaces intersecting the projected light beam 12 within the view of the camera. Camera 113 is preferably located so that its optical axis is at a 30 degree angle from the direction of the projected beam 12.

A second projector 17, projects a further pencil beam of light 18 at the surface of the object 13 along a second direction different from the first direction of the first beam 12. This is realized by arranging the projector 17 such that its projection axis is at a different angle than the projection axis of the first projector relative to the object 13. The reflected light 19 of light beam 18 is collected by camera assembly 114 which likewise includes a lens 110 and a video chip or linear array of photosensitive detectors 111. As with the camera 113, the optical axis of the camera assembly 114 is preferably at a 30 degree angle from the direction of its associated projected beam 18. The selection of a 30 degree angle between each camera and its corresponding projected beam is a compromise between high resolution (larger angle) and compactness of design and the ability to measure within interior corners (smaller angle) of the surface of the object 13.

The entire arrangement of the two-projector/detector assemblies or sensors is accurately moved relative to the object 13 by a motion assembly 117. In particular, the motion assembly 117 translates the sensors in a direction 112 so as to scan the object 13 and steps the sensors perpendicularly to the scanning path in a direction 115 to move the sensors to a next scanning path. At this path, the motion device 117 reverses the direction of translation so that the next scan is opposite but parallel to the direction 112. Continuation of this operation results in scanning of the object surface in a generally zig-zag manner (as shown by the dotted scan path in FIG. 1) in order to cover and map the entire surface of the object 13.

During each of the scanning operations, the energy in the reflected light beams 14 and 19 is collected by the respective cameras 113 and 114. This data is fed to a triangulation analyzing system 118 which, using standard triangulation procedures, determines the positions or locations of the object surface points. In usual systems where the projector/detector sensor assemblies are randomly placed, the analysis process of the system 118 requires merging of the data sets from the different sensors so as to develop data corresponding to a common cross section of the object. This merging process is difficult, time consuming and even when done often results in so-called "seams" where extrapolation of the data sets has been required.

In accordance with the principles of the present invention, the aforesaid merging process in the system 118 is greatly simplified by suitably arranging the projectors 11 and 17 of the sensor assemblies. In particular, the projectors are arranged such that their respective optical beams 12 and 18 are caused to traverse common planes during the aforementioned scanning operation. In the case shown in FIG. 1, this is accomplished by arranging the projector 17 such that its projection direction or axis, i.e., the second direction followed by the optical beam 18, lies in a common plane with the projection direction or axis of the projector 11, i.e., the first direction of beam 12, and the scan direction 112.

By so aligning beam 18 to lie within the plane of the beam 12 and the scan direction 112, both the light beams 12 and 18 produce intersections with the object surface 13 which lie within a plane with a fixed relationship to the object. Since all motion of the light beams 12 and 18 during a scan is within a plane defined by two invariant vectors, the plane is fixed in space. The data obtained from the reflected light during each scan thus represents points on a cross section of object 13 in a particular plane, such as the plane of beam 12 and the particular scan direction 112. As a result, no mathematical readjustment of the data is required to merge the data sets obtained from cameras 113 and 114 into a single cross section data set. This is particularly true if the coordinate systems in which the cameras 113, 114 report their data to the analyzer 118 have been registered into a single coordinate system by appropriate calibration and registration procedures. By the term registration is meant the process of aligning the measurement coordinate systems to provide identical coordinate values for each point measured in common by the two cameras.

The orientations of the two planes defined by the direction of beam 12 and the centerline or optical axis 14 of camera 113, and the direction of beam 18 and the centerline or optical axis 19 of the camera 114 are less restrictive and the cameras are positioned in a configuration such that one projector/detector assembly or sensor combination can "see" areas obscured or causing specular reflection to the other projector/detector assembly or sensor. Thus, each sensor develops data which can be used to supplement the data of the other sensor and this data can now be easily merged due to the common plane arrangement of the beams 12 and 18.

More particularly, the data collected by the two sensors is merged for each scan path or cross section of the scanning operation. Data voids from one sensor due to obscuration or specular reflection are now easily filled by data from the other sensor which is positioned to "see" the obscured view of the first sensor and vice versa. Because the data is coplanar, the plane in which they lie can be used as the reference plane. The merge and storage operations of the analyzing system 118 are thus reduced to a 2-dimensional procedure simplifying and speeding up the analysis task.

In the case of FIG. 1, if the beams 12 and 18 are of the same optical frequencies, the beams are directed in a given plane alternately and data is collected by the respective cameras 113 and 114 in order to distinguish the data from each other. This can be accomplished by controlling the motion device 117 to cause the sensor assemblies to jointly traverse each scan line twice before stepping to the next line, one scan being with the projector 11 on and the other scan with the projector 17 on. It can also be accomplished by controlling the motion device 117 so as to cause the sensors to jointly traverse the entire zig-zag path twice, first with the projector 11 on and then with the projector 17 on. Finally, it can be accomplished during a single translation of each line by turning the projectors 11 and 17 on and off alternately. Alternatively, if the beams 12 and 18 are of different frequencies, during each joint scan of a line the projectors 11 and 17 can be turned on simultaneously. In such case, the respective cameras 113 and 114 would contain filters to discriminate or block light reflected from the light beam of the projector associated with the other camera to enable taking data with both sensors at the same time.

Figure 2:
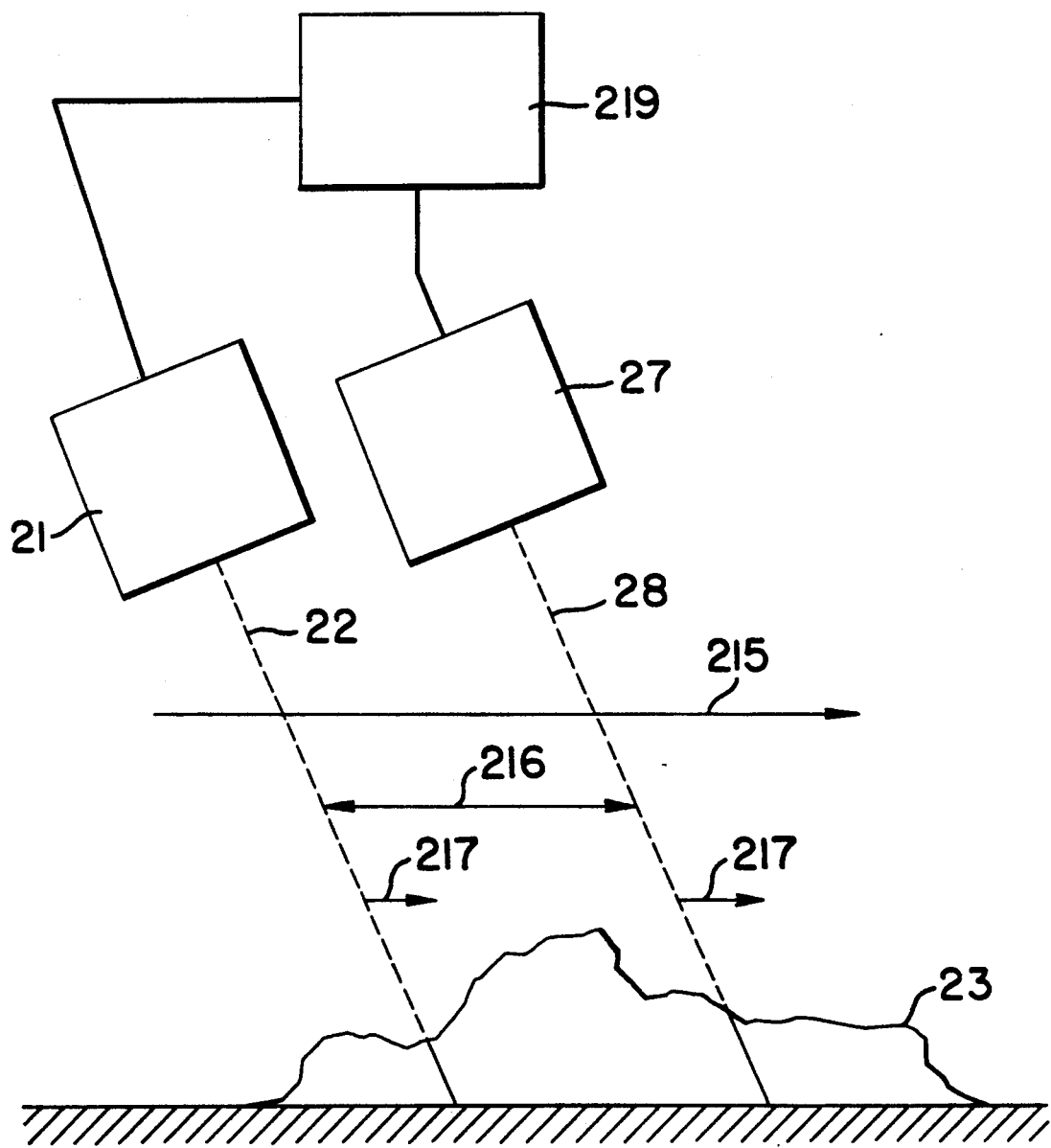
FIGS. 2 and 3 show second and third embodiments of an apparatus in accordance with the principles of the present invention in which multiple sensors are arranged to operate in parallel planes and to be stepped therebetween.

FIG. 2 shows a modification of the multi-sensor arrangement 1 of the invention. In the FIG. 2, the traversal of common planes by the projected different direction beams of the multiple sensors is achieved by arranging the projectors of the sensor assemblies so that their projection axes are at different directions and are in parallel planes defined by the projection axes and parallel scan directions. By stepping the projector/camera sensor assemblies successively, perpendicularly to the scan directions, one projector/camera assembly can be made to scan in the planes previously scanned by the other projector/camera assembly. As a result, scanning over common planes by both projectors is realized over the entire zig-zag scan path.

In FIG. 2, the scanning (translation) direction is into the plane of the drawing and two projector/camera sensor assemblies 21 and 27, like the assemblies in the FIG. 1 embodiment, are together stepped in the direction 215 in the plane of the drawing. Sensor 21 projects a beam of light 22 along a first projection direction onto the surface of an object 23. The projection or beam direction of the beam 22 and the scan direction (into the plane of the drawing) define a first plane seen in edge view in the drawing. Sensor 27 projects a beam of light 28 along a second projection direction different from the first direction, but in a plane defined by the second direction and the scan direction and parallel to the first plane. Thus, the beam 28 is seen as parallel to beam 22 in the plane of the drawing, but non-parallel when viewed from the stepping direction 215.

Sensors 21 and 27 are stepped by a motion device 219 in amounts 217 which are equal to or a submultiple of the separation distance 216. Sensor 21 thus scans the object surface 23 in the same plane as sensor 27 after the nth step, where n = distance 216 divided by distance 217. As a result, coplanar data developed by sensors 21 and 27 having different projection or beam directions is obtained as in the FIG. 1 embodiment. The resultant data thus has the same attributes in respect of merging as discussed above for the FIG. 1 sensors.

It should be noted that the motion device 219 can be used to translate the object 23, instead of the sensors 21 and 27, to effect the relative motion needed to obtain cross sectional data from object 23. A combination of scanning and stepping by either the sensors, the object or both is also possible.

Figure 3:
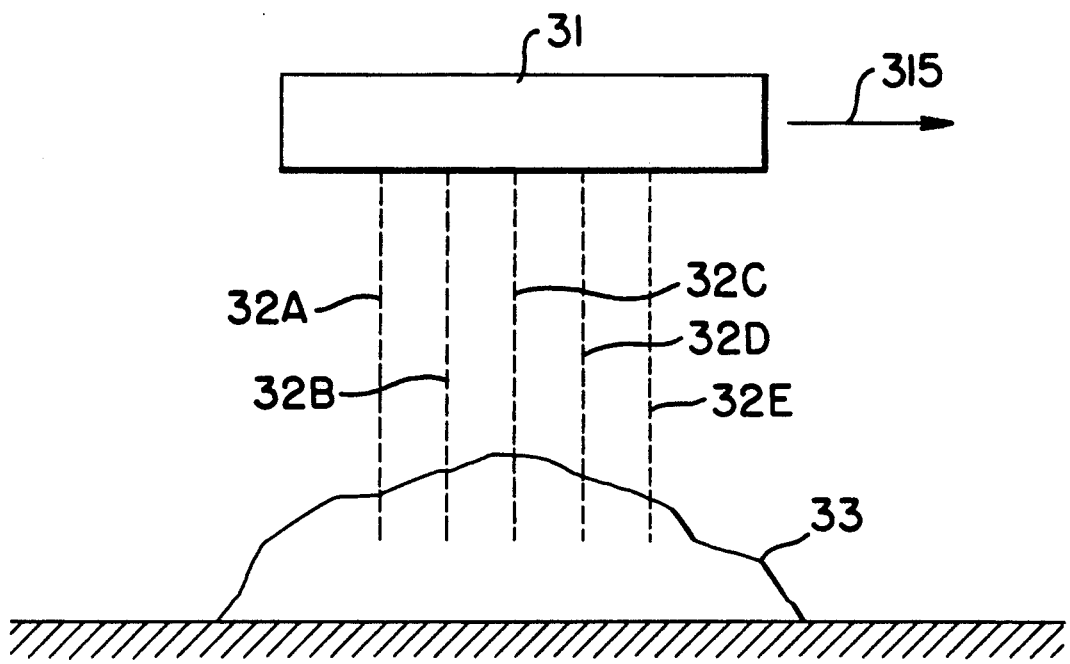

FIG. 3 shows a modification of the embodiment of FIG. 2 wherein additional sensors are provided for projecting a large number of beams at different projection directions so as to obtain additional coplanar data. Composite sensor assembly 31 comprises a number of N projector/camera sensors. These sensors project light beams 32A-32E in parallel planes defined by the respective projection directions of the beams and by respective parallel scan directions normal to the page of the drawing.

The projection directions of some or all of the beams 32A-32E are different or non-parallel as would be seen by viewing from the direction of stepping 315. For example, half of the light beams may have non-parallel projection directions at various different angles. These directions are selected to provide additional data obscured from view or specularly reflected at the common angle of the other half of the beams whose projection axes are parallel. Alternately, all beams may have non parallel projection directions.

In either case, the sensor 31 or object 33 is translated perpendicularly to the plane of the drawing and stepped in the direction 315 to obtain coplanar cross-sectional measurements of the object surface 33, as in the FIG. 2 embodiment. In particular, the sensor 31 or object 33 would be stepped in direction 315 by an amount equal to or a submultiple of the spacing between the projected light beams 32A-32E, which spacing is preferably made equal. On the nth step, where n is the separation distance between successive light beams in the direction 315 divided by the step distance, data developed from reflection of beam 32A would be coplanar with the previous data developed from beam 32B. In like manner, data developed from beam 32B would be coplanar with the previous data developed from beam 32C and so on thru beam 32D. Subsequent stepping movement similarly provides new data coplanar with previous data in like manner. As in the case of FIG. 2, this coplanar data when subsequently processed is more readily merged in the processing procedure to develop the object surface point locations.

In each of the embodiments of the invention discussed above, the optical energy from each projector is in the form of a pencil beam of light. These beams are subsequently translated along the object surface, while keeping their projection directions fixed, so as to obtain surface measurements from different directions at points of the object in a plane defined by the projection directions and the translation or scan direction. If each light beam is, however, spread out into a plane of light within the original plane formed by the beams and the scan direction, then no scanning would be required. In such case, the camera in each sensor would be an area array camera for sensing the two dimensional image of the reflected light from the light plane/object intersection. The camera axis would preferably be offset 30° from the light plane in the stepping direction.

Figure 4:
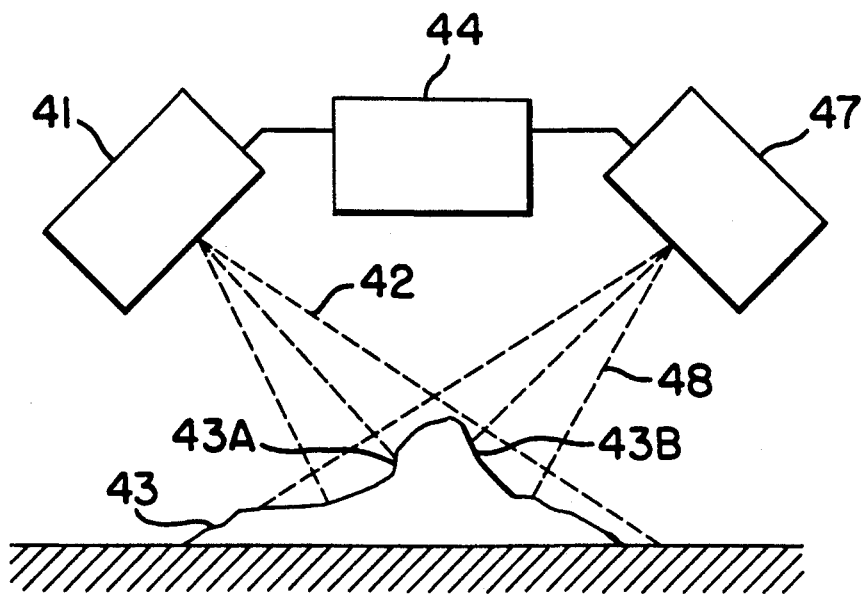
FIG. 4 shows a further embodiment of an apparatus in accordance with the principles of the present invention in which multiple sensors each project electromagnetic radiation in the form of a plane.

FIG. 4 illustrates the arrangement of FIG. 1 modified to provide for such planar optical energy projection. A projector/camera sensor 41, like the sensors of FIG. 1, projects a plane of light 42, shown as fan-shaped, in a first projection direction onto the surface of an object 43 and a like sensor 47 projects a like fan-shaped plane of light 48 in a second projection direction different from the first direction also onto the surface of the object 43. As in FIG. 1, the different direction light planes 42 and 48 lie within a single or common plane and have lateral extent sufficient to cover the scan path in the zig-zag path previously covered by translation of the pencil beams in FIG. 1. The data from the sensors is thus coplanar, like the data realized from the individual beams in FIG. 1.

In FIG. 4, the sensors 41 and 47 are arranged so that the surface measurements developed from each sensor for each plane complement one another in measuring the cross section of object 43 contained in that plane. For example, object portion 43B may be obscured from the view of sensor 41 but measurable by sensor 47. Similarly object portion 43A may only be measurable by sensor 41. As in the FIG. 1 case, sensors 41 and 47 are stepped by motion device 44 in a direction perpendicular to the plane of the drawing to acquire other cross sections in successive parallel planes.

The embodiments of invention in FIGS. 2 and 3 can also be modified so that the projected optical energy is in planar form, as in the FIG. 4 arrangement. In such case, scanning in a plane probably would not be necessary and the projected planar beams need then only be stepped to obtain the desired coplanar data for successive planes.

In all cases, it is understood that the above-described arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for use in determining the three-dimensional positions of the points on an object surface comprising:

first sensor means for causing first electromagnetic radiation to be directed in a first direction in a first plane over a first path extending in a third direction in said first plane and along said object surface and for collecting along a first axis the first electromagnetic radiation reflected from said object surface, said third direction being transverse to said first direction; and second sensor means for causing second electromagnetic radiation to be directed in a second direction in said first plane over said same first path extending in said third direction in said first plane and along said object surface and for collecting along a second axis the second electromagnetic radiation reflected from said object surface.

2. Apparatus in accordance with claim 1 further comprising:
means responsive to said first and second sensor means for determining the three dimensional positions of points on said object surface.

3. Apparatus in accordance with claim 1 wherein:
said first and second electromagnetic radiation is optical radiation.

4. Apparatus in accordance with claim 1 wherein:
the electromagnetic radiation directed by each sensor is at a frequency which is different than the frequencies of the electromagnetic radiation directed by the other sensors;
and each sensor is prevented from collecting electromagnetic radiation at the frequencies at which the other sensors direct radiation.

5. Apparatus in accordance with claim 1 wherein:
said first and second electromagnetic radiation each comprise a beam of electromagnetic radiation;
and said first and second sensor means comprise means for translating said first and second sensor means to cause beams of first and second electromagnetic radiation to translate in said third direction in said first plate to cover said first path.

6. Apparatus in accordance with claim 5 wherein:
said beam of first electromagnetic radiation is directed and translated and thereafter said beam of second electromagnetic radiation is directed said translated.

7. Apparatus in accordance with claim 1 wherein:
said first and second electromagnetic radiation each comprise a plane of radiation, said planes of first and second electromagnetic radiation having extent in said first and second directions, respectively, and in said third direction to cover said first path.

8. Apparatus in accordance with claim 7 wherein:
said first and second sensor means comprise means for stepping said first and second sensor means to cause said planes of first and second electromagnetic radiation to step in a fourth direction transverse to said third direction, said planes of first and second electromagnetic radiation after being stepped being in a plane parallel to said first plane and covering a further path extending in a direction parallel to said third direction and along said object surface;
and said collecting means of said first and second sensor means collect first and second electromagnetic radiation reflected by said object surface when the first and second electromagnetic radiation is directed in the parallel plane.

9. Apparatus is accordance with claim 7 wherein:
said plane of first electromagnetic radiation directed and thereafter said plane of second electromagnetic radiation is directed.

10. Apparatus in accordance with claim 1 wherein:
said first electromagnetic radiation is directed and thereafter said second electromagnetic radiation is directed.

11. Apparatus in accordance with claim 1 wherein:
said first and second sensor means comprise means for translating said first and second sensor means to cause said first and second electromagnetic radiation to be translated in said third direction to cover said first path.

12. Apparatus in accordance with claim 11 wherein:
said first and second sensor means comprise means for stepping said first and second sensor means to cause said first and second electromagnetic radiation to be stepped in a fourth direction transverse to said third direction; and
said translating means translates said first and second sensor means to cause said first and second electromagnetic radiation to be translated in a direction parallel to said third direction and in a plane parallel to said first plane over a further path along said object surface after said first and second electromagnetic radiation is stepped by said stepping means;
and said collecting means of said first and second sensor means collect the respective first and second electromagnetic radiation reflected by said object surface when the first and second electromagnetic radiation are in said parallel plane.

13. Apparatus in accordance with claim 1 wherein:
said first sensor means causes said first electromagnetic radiation to be directed over a succession of further paths along said object surface in said first direction in a succession of one or more further planes, respectively, parallel to said first plane, said further paths extending in directions parallel to said third direction, and collects said first electromagnetic radiation reflected during said direction in said succession of one or more further planes;
and said second sensor means causes said second electromagnetic radiation to be directed over said same succession of further paths along said object surface in said second direction in said succession of one or more further planes, respectively, and collects said second electromagnetic radiation reflected during said direction in said succession of one or more further planes.

14. Apparatus in accordance with claim 13 wherein:
said first and second sensor means further include: translation means for translating said first and second sensor means to cause said first and second electromagnetic radiation to be translated in the respective planes in which they are directed; and stepping means for stepping said first and second sensor means to enable said first and second electromagnetic radiation to be directed in said first plane and succession of one or more further planes.

15. Apparatus in accordance with claim 14 wherein:
as said first sensor means is causing said first electromagnetic radiation to be directed in each of said first plane and succession of one or more further planes said second sensor means is causing said second electromagnetic radiation to be directed in a plane of said first plane and succession of one or more further planes which is different from the plane in which said first electromagnetic radiation is being directed.

16. Apparatus in accordance with claim 15 wherein:
said first plane and succession of further planes are equally spaced.

17. Apparatus in accordance with claim 16 wherein:
said plane in which said second electromagnetic radiation is directed is spaced from the plane in which said first electromagnetic radiation is being directed by a multiple of said equal spacing.

18. Apparatus in accordance with claim 1 further comprising:
additional sensor means for causing respective additional electromagnetic radiation to be directed in respective additional directions which differ from each other and from the first and second directions in said first plane over said same first path extending in said third direction in said first plane and along said object surface and for collecting along axes which differ from each other and from the first and second axes the respective additional electromagnetic radiation reflected from said object surface.

19. Apparatus in accordance with claim 18 wherein:
said first, second and additional sensor means further cause their respective electromagnetic radiation to be directed over a succession of further paths along said object in their respective first, second and additional directions in a succession of one or more further planes parallel to said first plane, said further paths extending in directions parallel to said third direction, and collect their respective electromagnetic radiation reflected during said direction in said succession of one or more further planes.

20. Apparatus in accordance with claim 19 wherein:
said first, second and additional sensor means cause their respective electromagnetic radiation to be in different ones of said first and succession of one or more further planes at any given time.

21. Apparatus in accordance with claim 19 wherein:
said first, second and additional sensor means include translating means for translating said first, second and additional sensor means to cause their respective electromagnetic radiation to translate in the respective planes in which the radiation is directed; and stepping means for stepping the first, second and additional sensor means to enable the respective electromagnetic radiation to be directed in said first plane and succession of one or more further planes.

22. Apparatus in accordance with claim 21 wherein:
said translating means translates each said sensor means substantially simultaneously;
and said stepping means steps each said sensor means substantially simultaneously.

23. Apparatus in accordance with claim 21 wherein:
said translating means and stepping means operate in sequence.

24. Apparatus in accordance with claim 18 wherein:
each of said said sensor means comprises: a projector having a projection axis along which the sensor directs its respective electromagnetic radiation; and camera means for collecting the reflected electromagnetic radiation directed by the sensor means and having an optical axis at an angle to the projection axis of the projector of the sensor means.

25. Apparatus in accordance with claim 1 wherein:
said first sensor means comprises: a first projector having a first projection axis along said first direction; and camera means for collecting said reflected first electromagnetic radiation and having a first optical axis along said first axis and at an angle to said first projection axis;
and said second sensor means comprises: a second projector having a second projection axis along said second direction; and a second camera means for collecting said second reflected second electromagnetic radiation and having a second optical axis along said second axis and at an angle to said second projection axis.

26. A method for use in determining the three-dimensional positions of the points on an object surface comprising:
directing first electromagnetic radiation in a first direction in a first plane over a first path extending in a third direction in said first plane and along said object surface and collecting along a first axis the first electromagnetic radiation reflected from said object surface, said third direction being transverse to said first direction;
directing second electromagnetic radiation in a second direction in said first plane over said same first path extending in said third direction in said plane and along said object surface and collecting from along a second axis the second electromagnetic radiation reflected from said object surface.

27. A method in accordance with claim 26 further comprising:
determining the three dimensional positions of points on said object surface from said collected electromagnetic radiation.

28. A method in accordance with claim 26 wherein:
said first and second electromagnetic radiation is optical radiation.

29. A method in accordance with claim 26 wherein:
the electromagnetic radiation directed along each direction is at a frequency which is different than the frequencies of the electromagnetic radiation directed along the other directions;
and collecting of the reflected electromagnetic radiation directed along each direction is exclusive of the collecting of the reflected electromagnetic radiation direction along the other directions.

30. A method in accordance with claim 26 wherein:
said first and second electromagnetic radiation each comprise a beam of electromagnetic radiation;
and said steps of directing include translating said beams of first and second electromagnetic radiation in said third direction in said first plane to cover said first path.

31. A method in accordance with claim 26 wherein:
said first and second electromagnetic radiation each comprise a plane of radiation, said planes of first and second electromagnetic radiation having extent in said first and second directions, respectively, and in said third direction to cover said first path.

32. A method in accordance with claim 31 wherein:
said steps of directing include stepping said planes of first and second electromagnetic radiation in a fourth direction transverse to said third direction to a plane parallel to said first plane to cover a further path extending in a direction parallel to said third direction and along said object surface;
and said collecting of the reflected first and second electromagnetic radiation includes collecting the first and second electromagnetic radiation reflected by said object surface when the first and second electromagnetic radiation is in the parallel plane.

33. A method in accordance with claim 26 wherein:
first steps of directing include translating said first and second electromagnetic radiation in said third direction to cover said first path.

34. A method in accordance with claim 33 wherein:
said steps of directing include stepping said first and second electromagnetic radiation in a fourth direction transverse to said third direction;

said step of translating includes translating said first and second electromagnetic radiation in a direction parallel to said third direction in a plane parallel to said first plane over a further path along said object surface after said first and second electromagnetic radiation is stepped;

and said collecting of said reflected first and second electromagnetic radiation includes collecting the respective first and second electromagnetic radiation reflected by said object surface when the first and second electromagnetic radiation are in said parallel plane.

35. A method in accordance with claim 26 further comprising:

directing said first electromagnetic radiation over a succession of further paths along said object surface in said first direction in a succession of one or more further planes parallel to said first plane, said further paths extending in directions parallel to said third direction, and collecting said first electromagnetic radiation reflected during said directing in said succession of one or more further planes;

and directing said second electromagnetic radiation over said same succession of further paths along said object surface in said second direction in said succession of one or more further planes and collecting said second electromagnetic radiation reflected during said directing in said succession of one or more further planes.

36. A method in accordance with claim 35 wherein: said steps of directing further include: translating said first and second electromagnetic radiation in the respective planes in which they are directed; and stepping said first and second electromagnetic radiation to enable said first and second electromagnetic radiation to be directed in said first plane and succession of one or more further planes.

37. A method in accordance with claim 26 further comprising:

directing respective additional electromagnetic radiation in respective additional directions which differ from each other and from the first and second directions over the same first path extending in said third direction in said first plane and along said object surface and collecting along further axes which differ from each other from said first and second axes the respective additional electromagnetic radiation reflected from said object surface.

38. A method in accordance with claim 37 further comprising:

directing said first, second and additional electromagnetic radiation over a succession of one or more second and additional directions in a succession of one or more further planes parallel to said first plant, said further paths extending in directions parallel to said third direction, and collecting the respective electromagnetic radiation reflected during said direction in said succession of one or more further planes.

39. A method in accordance with claim 38 wherein: said first, second and additional electromagnetic radiation is directed in different ones of said first and succession of one or more further planes at any given time.

40. A method in accordance with claim 38 wherein: said steps of directing include translating the respective first, second additional electromagnetic radiation in the respective planes in which the radiation is directed; and stepping the respective first, second and additional electromagnetic radiation to enable the respective electromagnetic to be directed in said first plane and succession of one or more further planes.

41. Apparatus in accordance with claim 1 further comprising:

means for effecting relative movement between said object surface and said first and second sensors.

42. Apparatus in accordance with claim 41 wherein: said means for effecting relative movement steps said object surface in a direction transverse to said first plane.

43. A method in accordance with claim 26 further comprising:

effecting relative movement between said object surface and said first and second electromagnetic radiation.

44. A method in accordance with claim 43 wherein: said step of effecting relative movement comprises moving said object surface in a direction transverse to said first plane.

45. A method in accordance with claim 37 wherein: the electromagnetic radiation directed along each direction is at a frequency which is different than the frequencies of the electromagnetic radiation directed along the other directions;

and collecting of the reflected electromagnetic radiation directed along each direction is exclusive of the collecting of the reflected electromagnetic radiation directed along the other directions.

46. Apparatus in accordance with claim 13 wherein: the electromagnetic radiation directed by each sensor is at a frequency which is different than the frequencies of the electromagnetic radiation directed by the other sensors;

and each sensor is prevented from collecting electromagnetic radiation at the frequencies at which the other sensors direct radiation.

47. Apparatus in accordance with claim 18 wherein: the electromagnetic radiation directed by each sensor is at a frequency which is different than the frequencies of the electromagnetic radiation directed by the other sensors;

and each sensor is prevented from collecting electromagnetic radiation at the frequencies at which the other sensors direct radiation.

48. Apparatus in accordance with claim 19 wherein: the electromagnetic radiation directed by each sensor is at a frequency which is different than the frequencies of the electromagnetic radiation directed by the other sensors;

and each sensor is prevented from collecting electromagnetic radiation at the frequencies at which the other sensors direct radiation.

49. A method in accordance with claim 38 wherein: the electromagnetic radiation directed along each direction is at a frequency which is different than the frequencies of the electromagnetic radiation directed along the other directions;

and collecting of the reflected electromagnetic radiation directed along each direction is exclusive of the collecting of the reflected electromagnetic radiation directed along the other directions.

50. A method in accordance with claim 35 wherein: the electromagnetic radiation directed along each direction is at a frequency which is different than the frequencies of the electromagnetic radiation directed along the other directions;

and collecting of the reflected electromagnetic radiation directed along each direction is exclusive of the collecting of the reflected electromagnetic radiation directed along the other directions.

* * * * *

UNITED STATES PATENT AND TRADEMARK OFFICE
CERTIFICATE OF CORRECTION

PATENT NO. :  5,028,799

DATED  :  July 2, 1991

INVENTOR(S) :  Sullivan Chen, et al.

It is certified that error appears in the above-identified patent and that said Letters Patent is hereby corrected as shown below:

Col.7, line 24.   (Claim 5, last line).   Change "plate" to -- plane --

Col. 7, line 28.   (Claim 6, line 4).   Change "said" to -- and --

Col. 7, line 55.   (Claim 9, line 2).   After "radiation" insert -- is --

Col. 10, line 33.   (Claim 29, last line).   Change "direction" to -- directed --

Col. 10, line 62.   (Claim 33, line 2).   Change "first" first occurrence to -- said --

Col. 11, line 41.   (Claim 37, line 6).   Change "the" to -- said --

Col. 11, line 50. (Claim 38, line 4).   After "more" insert -- further paths along said object surface in the respective first, --

UNITED STATES PATENT AND TRADEMARK OFFICE
CERTIFICATE OF CORRECTION

PATENT NO. : 5,028,799

DATED : July 2, 1991

INVENTOR(S) : Sullivan Chen, et al

It is certified that error appears in the above-identified patent and that said Letters Patent is hereby corrected as shown below:

Col. 11, line 53. (Claim 38, line 7). Change "plant" to --plane--.

Signed and Sealed this

Seventeenth Day of November, 1992

Attest:

DOUGLAS B. COMER

Attesting Officer

Acting Commissioner of Patents and Trademarks